United States Patent [19]

Haglöf

[11] Patent Number: 4,798,003
[45] Date of Patent: Jan. 17, 1989

[54] THREAD MEASURING DEVICE

[76] Inventor: Ingvar Haglöf, Strömvägen 56, S-882 00 Långsele, Sweden

[21] Appl. No.: 87,679
[22] PCT Filed: Dec. 9, 1986
[86] PCT No.: PCT/SE86/00560
  § 371 Date: Jul. 22, 1987
  § 102(e) Date: Jul. 22, 1987
[87] PCT Pub. No.: WO87/03675
  PCT Pub. Date: Jun. 18, 1987

[30] Foreign Application Priority Data

Dec. 16, 1985 [SE] Sweden ................... 8505944

[51] Int. Cl.⁴ .............................. G01C 15/00
[52] U.S. Cl. ..................... 33/134 R; 33/1 LE; 33/140
[58] Field of Search ............ 33/127, 140, 1 LE, 404, 33/405, 413, 414, 141 E, 409, 407, 408, 134

[56] References Cited

U.S. PATENT DOCUMENTS

| | | | |
|---|---|---|---|
| 1,448,931 | 3/1923 | Manning | 33/140 X |
| 2,676,411 | 4/1954 | Horch | 33/140 |
| 2,706,336 | 4/1955 | Gruber | 33/134 R X |
| 2,747,286 | 5/1956 | Bedell | 33/134 R |
| 3,253,337 | 5/1966 | Ebert | 33/1 LE |
| 3,763,567 | 10/1973 | Hudis | 33/413 X |

FOREIGN PATENT DOCUMENTS 8401328-3 10/1985 Sweden .

Primary Examiner—William D. Martin, Jr.
Attorney, Agent, or Firm—Nies, Webner, Kurz & Bergert

[57] ABSTRACT

A thread meter comprising a holder for a thread reel, a counter provided with a rotary measuring wheel and guides for a thread, and an outer casing for enclosing said details. The invention is characterized in that a first guide (19) for a thread (20) is located between said holder (13) and said measuring wheel (16), that a second guide (26) for the thread is formed by said casing (4,6), which consists of a first portion (4) and a second portion (6), which are hingedly interconnected, that in the first portion (4) a recess (26) extends from an edge (27) of the wall of the first portion (4), and the second portion (6) of the casing is arranged to bridge the opening (28) of the recess (26) along said edge (27), so that a hole with closed periphery is formed, and that said wheel (16) is located along a line extending between said guides (19', 26, 30').

5 Claims, 1 Drawing Sheet

THREAD MEASURING DEVICE

This invention relates to a so-called thread meter, which is a device, out of which a thread can be drawn by moving the device away from a place where the free end of the thread is attached. At its outfeed, the thread is caused to actuate a counter, which records the length of thread fed out.

Such thread meters are per se previously known. The known thread meters, however, are arranged so that the thread prior to its leaving the device is passed and fed through several holes.

This implies two substantial disadvantages. One of them is, that it is very difficult in a hard environment, such as in a forest in wintertime or generally under bad weather conditions, to thread a thread, which is of the type sewing thread, through a plurality of small holes. This, however, is required when a thread reel is to be changed. The other disadvantage is, that the maximum feeding speed is extremely limited to prevent the thread from breaking. Such thread meters are used in many different connections when a distance is to be measured. As examples can be mentioned the measuring of distances at forest surveys, measuring of distances for military purposes such as for positioning artillery pieces, measuring of distances at construction work, land surveying, measuring of cable lengths required at power cable drawing etc., as well as in entirely different connections, such as measuring the length of an orienteering course etc.

In certain applications it is desired to be able to measure a distance while using a transport means, such as a car, snow scooter or other vehicle. It is not possible to use known thread meters in such connections, because the thread is so arranged via holes and guides, that it breaks at a low speed, for example 10–15 km/hour.

The present invention solves the aforesaid problems and provides a thread meter with a structure, which is much simpler and cheaper than known thread meters.

The present invention, thus, relates to a thread meter comprising a holder for a thread reel, a counter provided with a rotary measuring wheel and guides for a thread, and an outer casing enclosing those elements, and is characterized, in that a first guide for a thread is located between the holder and the measuring wheel, that a second guide for the thread is formed by means of the casing, which casing consists of a first and a second portion hingedly interconnected, where in said first portion a recess extends from an edge of the wall of the first portion, and where the second portion of the casing is arranged to bridge the opening of the recess along the edge, so that a hole with closed periphery is formed, and that the wheel is located along a line extending between said guides.

The invention is described in greater detail in the following with reference to the accompanying drawing, in which FIGS. 1 and 2 shows a mechanism relating to the present thread meter and, respectively, a casing, where for the formation of a thread meter according to the invention the mechanism is placed in the casing, FIG. 3 shows a portion of a third guide in detail, FIG. 4 shows a first guide in detail.

In FIGS. 1 and 2 a thread meter according to the invention is shown. The numeral 1 designates a mechanism, and the numeral 2 designates a casing. It is only for the sake of clearness, that the thread meter is shown divided in two Figures. The mechanism 1 is so located in the casing 2, that the bottom plate 3 of the mechanism abuts the bottom 5 of the first portion 4 of the casing 2. The casing 2 also comprises a second portion 6, which constitutes a cover, which via hinges 7,8 is hingedly connected with the first portion 4. Upon folding upward the second portion 6, as indicated by the arrow 9, the second portion 6 joins with the first portion 4, so that a parallelepiped box is formed, which entirely encloses the mechanism 1. Suitable snap-in devices 10,11 are provided on the second portion 6 for co-operation with the upper lateral edge 12 of the first portion 4, so that the box can be kept closed.

The mechanism 1 comprises a holder 13 for a thread reel, consisting of an upright pipe. In FIG. 1 a thread reel 14 is indicated by dashed lines. The mechanism further comprises a suitable known counter 15 provided with a rotatry measuring wheel 16, about which a thread 20 is wound in one or several turns. The counter 15 records the number of turns, through which the measuring wheel 16 rotates, which corresponds to a certain distance, which can be read in the digit window 17 of the counter. The counter is provided with a zero setting button 18.

A first guide 19 for the thread 20 is located between the holder 13 and meausuring wheel 16. The guide 19 is connected with the bottom plate 3 and abuts with a certain pressure the measuring wheel via a cushion 21 of an elastic material. Between the cushion 21 and bottom plate 3, the guide is provided with a groove 22, which on one side is defined by two lugs 23,24 bent away from each other. In FIG. 4 said guide is shown seen from the right in FIG. 1. This design implies, that a thread 20 can be inserted into the groove from the side, as indicated by the arrow 25 in FIG. 4.

According to the invention, a second guide is formed by a recess 26 extending from one edge 27 of the wall of the first portion 4 of the casing, and by the second portion of the casing being arranged so that, when it is moved to its position joining the first portion, it bridges the opening 28 of the recess 26 along said edge 27, so that a hole with a closed periphery is formed.

In Fig, 2 dash-dotted lines 29,30 show the position for the edges 29', 30' of the second portion 6 of the casing when this portion is in said joining position.

According to a preferred embodiment, a third guide 31 is provided, which is shown partially also in FIG. 3, where the guide 31 is shown seen from the left in FIG. 1. The third guide 31 comprises a U-shaped groove 32 and spaced therefrom a shoulder 33, the lower edge 34 of which is located on a lower level thatn the opening of the U-shaped groove 32.

This guide, thus, also is formed so that a free opening 35 is provided where a thread can be directed into the groove 32.

The third guide is located between the measuring wheel 16 and the second guide 26 and, when the mechanism is located in the casing 2, is located immediately inside of the recess 26.

It is, thus, obvious that the thread is not required to be threaded through any hole, but can first be drawn out outside the device and thereafter be moved in a direction substantially perpendicular to the longitudinal direction of the thread so as to be located in the grooves 22,32 and recess 26. When the second portion 6 of the casing is moved to its closing position, a hole, as stated, with closed periphery is formed through the wall of the casing by means of the recess 26 and edge 30'.

This design implies, that it is very easy to position a thread even under hard weather conditions. It is further easy to joint a thread for a new thread reel. This is carried out so, that the thread from a substantially spent thread reel is drawn or cut off outside the thread meter and thereafter tied to the leading end of the thread on a new thread reel, whereafter the used thread reel is removed and the new thread reel positioned on the holder 13. Thereafter the new thread is inserted into the grooves 22,32 and wound one or possibly several turns about the measuring wheel 16. Finally, it is observed that the thread is located in the recess 26, whereafter the second portion of the casing is moved to its closing position.

The function of said cushion 21 is to constitute a weak brake against the measuring wheel to prevent it from rotating when the person carrying the thread meter halts, and to see to it that the thread 20 remains wound around and in engagement with the measuring wheel 16.

According to the invention, the measuring wheel 16 is located along a line extending between said first and second guides. According to a preferred embodiment, the measuring wheel 16 is located so that a line extending through said guides is tangent to the periphery of the measuring wheel. Due to the location of the measuring wheel 16 in relation to the guides, the thread runs substantially along a straight line from the thread reel and out of the casing. This provides, that the thread meter can be moved at substantially higher speeds than known thread meters. The present thread meter, thus, can be moved at speeds up to 40 km/hour without any problems whatsoever.

It is obvious, that the present invention solves the problems referred to in the introductory portion.

It also is obvious that the structure of the thread meter is particularly simple. The frame 36 of the mechanism is made in one piece, for example, of acrylate plastic. The measuring wheel 16 is made, for example, of nylon reinforced with glass fibres. The casing is made, for example, of ABS-plastic.

The present thread meter, thus, has a simple structure, allows for simple handling of the thread and has high performance.

The present invention, of course, can be modified in ways obvious to the expert to embodiments other than the ones described above by way of example.

The present invention, thus, must not be regarded restricted to the embodiments described above, but can be varied within the scope defined in the attached claims.

I claim:

1. A thread meter comprising: a holder for a thread reel, a counter with a rotary measuring wheel and plural guides for a thread, and an outer casing with two portions to contain said reel, said counter and measuring wheel, and said guides, the improvement comprising: a first guide (19) of said plural guides for a thread (20) being located within said casing between said reel holder (13) and said measuring wheel (16); a second of said guides, guide (26) for the thread is formed by the two portions of said casing (4,6), a first portion (4) and a second portion (6), which are hingedly interconnected; said first portion (4) having an end wall with a top edge (27) and having a recess (26) extending from said edge (27); and said second portion (6) of the casing being constructed, when said casing portions are hingedly closed, to bridge the opening (28) of the recess (26) along said edge (27), whereby said recess and said bridge form a hole with a closed periphery, and the periphery of said wheel (16) being located within said casing along a line extending between said two guides (19', 26, 30').

2. A thread meter as defined in claim 1, characterized in that said first guide comprises a second groove (22), which has not a closed periphery, but has an opening, enabling a thread to be moved substantially perpendicularly to the longitudinal direction of the thread into the second groove (22).

3. A thread meter as defined in claim 2, characterized in that a third guide (31) is located between said measuring wheel (16) and said recess (26) and comprises a third groove (22;32), which has not a fully closed periphery, but has an opening, so that a thread can be moved substantially perpendicularly to its longitudinal direction into the third groove (22;32).

4. A thread meter as defined in claim 1, characterized iun that a thread extending through saíd plural guides (19;26,30'; 31) is tangent to said measuring wheel (16).

5. A thread meter as defined in claim 4 wherein a base structure is provided which includes said holder for said thread reel and supports said counter and its rotary measuring wheel and includes, as structurally integral parts, said first thread guide and said third thread guide and said base structure is secured to said first portion of said casing with said first and third thread guides aligned with said the wall recess part of said second thread guide.

* * * * *

UNITED STATES PATENT AND TRADEMARK OFFICE
CERTIFICATE OF CORRECTION

PATENT NO. : 4,798,003
DATED : January 17, 1989
INVENTOR(S) : INGVAR HAGLOF

It is certified that error appears in the above-identified patent and that said Letters Patent is hereby corrected as shown below:

The title should read:

--SURVEY DISTANCE MEASURING INSTRUMENT--

The ABSTRACT should read as follows:

--ABSTRACT

A thread or string meter for measuring distances, e.g. in surveying, which includes a holder for a thread reel, a counter provided with a rotary measuring wheel and guides for a thread. An outer casing encloses the above named elements. A first guide for the thread or string is located between the reel holder and the measuring wheel. A second guide for the thread is formed by casing structure, consisting of a first portion and a second portion which are hingedly interconnected. In the first portion a recess extends from a wall edge, the second portion of the casing being arranged to bridge the first portion recess opening along the wall edge so that the recess and the bridge constitute a guide hole with a closed periphery.

Figure 1:
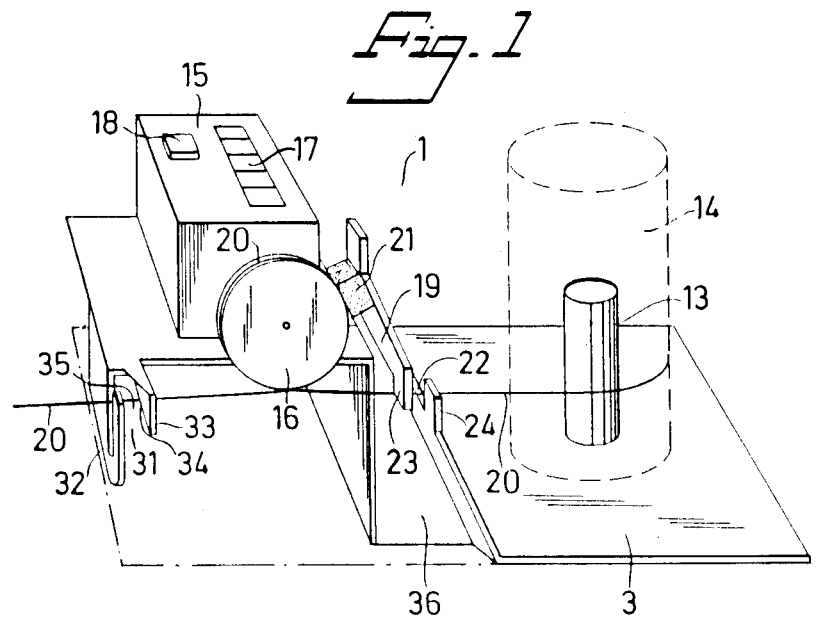
Figure 2:
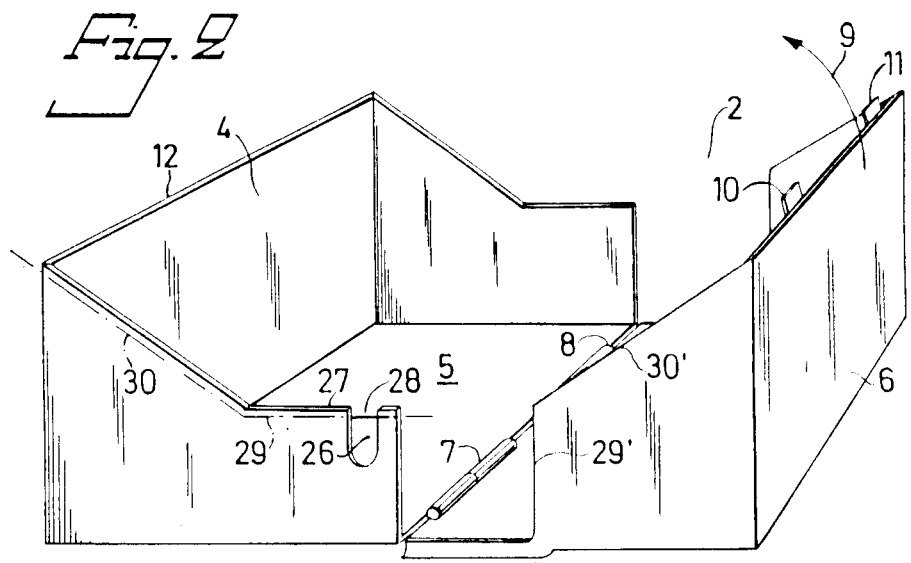
Figure 3:
Figure 4:
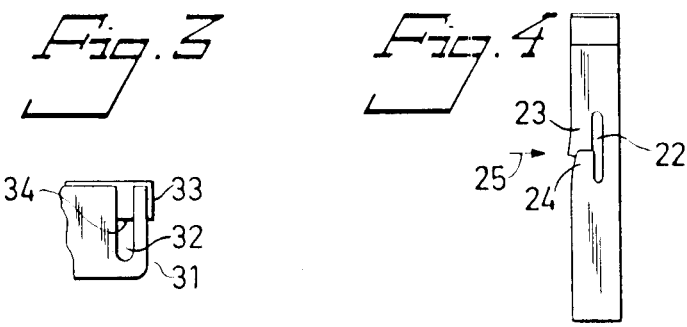

UNITED STATES PATENT AND TRADEMARK OFFICE
CERTIFICATE OF CORRECTION

PATENT NO. : 4,798,003
DATED : January 17, 1989
INVENTOR(S) : INGVAR HAGLOF

It is certified that error appears in the above-identified patent and that said Letters Patent is hereby corrected as shown below:

The measuring wheel periphery is located along a line extending between the two guides.--.

Signed and Sealed this

Sixteenth Day of May, 1989

Attest:

DONALD J. QUIGG

Attesting Officer

Commissioner of Patents and Trademarks